United States Patent Office 3,595,632
Patented July 27, 1971

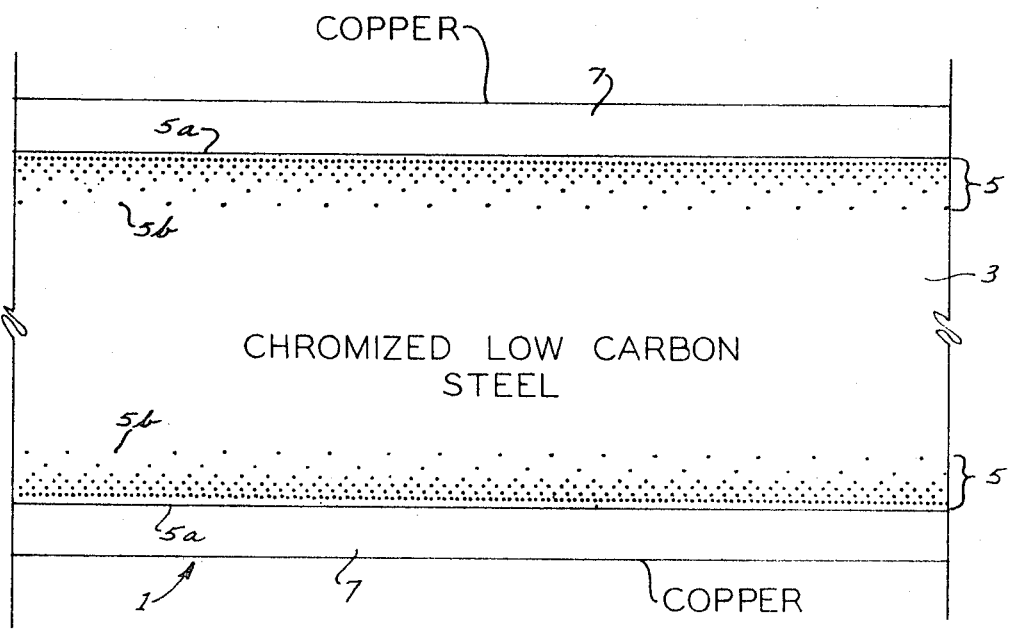

3,595,632
CORROSION-RESISTANT COMPOSITE SHEET METAL MATERIAL
John W. Ross, Cumberland, R.I., assignor to Texas Instruments Incorporated, Dallas, Tex.
Filed Sept. 23, 1968, Ser. No. 761,722
Int. Cl. B32b 15/00
U.S. Cl. 29—196.3                            10 Claims

ABSTRACT OF THE DISCLOSURE

Composite sheet metal material for exterior sheet metal building products, such as gutters, downspouts, flashing, roofing, siding and the like, and resistant to corrosion, including galvanic corrosion, consisting of a core layer of chromized low carbon steel clad with copper.

---

This invention relates to composite sheet metal material, and more particularly to corrosion-resistant composite sheet metal material for exterior sheet metal building products such as gutters, down-spouts, flashing, roofing, siding and the like, which are subject to exposure to rain, hence being subject to galvanic corrosion.

It will be understood that sheet copper is an excellent material for guttering, downspouts and the like because it is attractive in appearance and per se corrosion resistant. However, solid copper guttering, downspouts etc. are relatively expensive. Use of a lower cost composite sheet metal material (i.e., a multilayer material) having a core layer of a metal of lower cost than copper clad on both sides with copper is of considerable interest for such products, but has presented a problem of avoiding galvanic corrosion of the material, noting that it is subject to exposure to rain.

Among the several objects of this invention may be noted the provision of composite sheet metal material having a core layer of a metal of relatively low cost (as compared to copper or stainless steel, for example) clad on both sides with copper, thus being of lower cost than solid copper material, while retaining the advantages of copper in the product, and which is resistant to galvanic corrosion; and the provision of composite sheet metal material such as described which is relatively economical to manufacture and readily fabricated into exterior sheet metal building products such as gutters, downspouts, flashing, roofing and the like. In general, composite sheet metal material of this invention comprises a layer of chromized steel, i.e., steel having chromium diffused into the surfaces thereof, clad with copper. Other objects and features will be in part apparent and in part pointed out hereinafter.

In the accompanying drawing, in which one of various possible embodiments of the invention is illustrated, the single figure illustrates a section of composite sheet metal material made in accordance with this invention, thicknesses being greatly exaggerated.

Referring to the drawing, composite sheet metal material 1 made in accordance with this invention is shown to consist of a core layer 3 of chromized low carbon steel, i.e., low carbon steel having chromium diffused into the surfaces thereof as indicated at 5, and clad on each chromized surface thereof with a layer 7 of copper.

The material of core layer 3 is per se a corrosion-resistant sheet steel material made by diffusing chromium into the surfaces of cold rolled low carbon steel sheet to form uniform, continuous, ductile corrosion-resistant coatings or layers at the surfaces of the base steel integral with the latter, as indicated at 5. The chromium content of each of the coatings or layers 5 varies from its outer surface 5a to its interface 5b with the base steel, decreasing in content from the outer surface 5a to the interface 5b. For example, the chromium content at the outer surface 5a may range from about 25% to 30%, and the chromium content at the interface 5b may range from about 12% to 13%, the percentage decreasing generally uniformly in a gradient from the outer surface to the interface. Chromized steel of this type is commercially available from Bethlehem Steel Company, for example. Its performance is comparable to that of Bethlehem Steel Company's type 430 stainless steel, while being substantially lower cost (e.g., about half the cost). It has previously been used for such products as automobile mufflers and tailpipes and others subjected to high temperature oxidation.

The copper layers 7 are clad on the surfaces 5a of the core layer 3 by known solid phase bonding technique such as disclosed in U.S. Pat. 2,691,815, for example. Typically, the total thickness of the composite sheet metal material 1 may range from about 0.006 inch to 0.060 inch, and preferably is within the range from about 0.012 inch to 0.018 inch. Within the broad range of total thickness, the thickness of each copper layer 7 may range from about 0.001 inch to 0.012 inch. In the preferred range of total thickness (i.e., from about 0.012 inch to 0.018 inch), the copper-core-copper ratio is preferably 10/80/10. The drawing illustrates composite sheet metal material 1 in which the total thickness is about 0.015 inch, the core 3 being about 0.012 inch thick and each copper layer being about 0.0015 inch thick. Also, as shown therein, the chromium is diffused into each surface of the core to a depth of about 0.0015 inch, i.e., about the same as the thickness of each copper layer. Generally, the depth of penetration of the chromium into the copper may range from about 0.0015 inch to 0.002 inch.

We have observed that the galvanic potential between copper and the chromium/steel composition of surface coatings or layers 5 of the core 3 in a wet environment is relatively low, hence galvanic corrosion of the composite material 1 (i.e., corrosion due to electrolytic action when the different metals are in a wet environment) is minimized. For example, the galvanic potential between copper and the chromium/steel composition is considerably lower than the galvanic potential between copper and low carbon steel per se. Accordingly, the material 1, wherein the copper layers are in contact with the chromium/steel coatings or layers 5, is substantially resistant to galvanic corrosion if water should penetrate to the interfaces at 5a between the copper layers and the core layer, and is therefore highly suitable for use as stock for the manufacture of exterior building products subject to exposure to rain (e.g., gutters, downspouts, flashing, roofing, siding, etc.), even though breaks may develop in the copper layers (during fabrication or subsequent handling and use) through which rain may penetrate to the interfaces between the copper layers and the core layer. Moreover, use of the core layer material as above described is relatively inexpensive, as compared to use of solid stainless steel sheet for example, for the core layer and the composite material 1 is considerably less expensive than all-copper sheet of comparable thickness, thus providing a material which is comparable to solid copper, for example, as regards durability and appearance, while being of substantially lesser cost.

Not only is the galvanic potential between the copper layers 7 and chromium/steel layers 5 relatively low, but since the concentration of chromium in the layers 5 decreases generally uniformly inward from the surfaces 5a, the galvanic potential between successive increments of thickness in layers 5 is relatively low. Accordingly, galvanic corrosion within layers 5 and as between layers 5 and the low carbon steel at the interface 5b is minimized In other words, there is a substantial matching of galvanic potential between each copper layer 7 and core layer 3 at the interface 5a, and a substantial matching of galvanic potential from point-to-point depthwise into the core layer.

In view of the above, it will be seen that the several objects of the invention are achieved and other advantageous results attained.

As various changes could be made in the above products without departing from the scope of the invention, it is intended that all matter contained in the above description or shown in the accompanying drawing shall be interpreted as illustrative and not in a limiting sense.

What is claimed is:

1. Composite sheet metal material resistant to galvanic corrosion comprising a base layer including a low carbon steel core and an integral surface layer of chromized steel having a preselected chromium content and a layer of copper clad on said surface layer.

2. Composite sheet metal material as set forth in claim 1 wherein the copper is relatively thin in relation to the base layer.

3. Composite sheet metal material as set forth in claim 2 wherein the integral surface layer is thin in relation to the thickness of the base layer.

4. Composite sheet metal material as set forth in claim 3 wherein the chromium content decreases from the surface of the integral surface layer to the interface with the core.

5. Composite sheet metal material resistant to galvanic corrosion comprising a core layer of low carbon steel having chromium diffused into the surfaces thereof forming integral corrosion-resistant chromium bearing coatings at the surface of the core layer, and a layer of copper bonded to each face of the core layer.

6. Composite sheet metal material as set forth in claim 5 wherein the total thickness of the material is in the range from about 0.006 inch to 0.060 inch and the thickness of each copper layer is in the range from about 0.001 inch to 0.012 inch.

7. Composite sheet metal material as set forth in claim 6 wherein the copper-core-copper thickness ratio is about 10/80/10.

8. Composite sheet metal material as set forth in claim 5 wherein the total thickness of the material is in the range from about 0.012 inch to 0.018 inch and the copper-core-copper thickness ratio is about 10/80/10.

9. Composite sheet metal material as set forth in claim 6 wherein the chromium is diffused into the steel to a depth of from about 0.0015 inch to 0.002 inch.

10. Composite sheet metal material as set forth in claim 9 wherein the chromium content decreases inward from the surfaces of the steel.

References Cited

UNITED STATES PATENTS

| | | | |
|---|---|---|---|
| 1,306,690 | 6/1919 | Gillespie | 29—196.6 |
| 1,998,496 | 4/1935 | Fiedler | 29—196.6 |
| 2,508,979 | 5/1950 | Van Gessel | 29—196.3 |
| 2,547,947 | 4/1951 | Kleis | 29—196.3 |
| 2,941,289 | 6/1960 | Chace | 29—196.3 |
| 2,957,782 | 10/1960 | Boller | 29—196.6 |
| 3,198,609 | 8/1965 | Cape | 29—196.3 |
| 3,249,456 | 5/1966 | Carosella | 29—196.6 |

HYLAND BIZOT, Primary Examiner